United States Patent
Mobin et al.

(10) Patent No.: US 8,819,293 B2
(45) Date of Patent: *Aug. 26, 2014

(54) METHOD AND SYSTEM FOR COMMUNICATING ACROSS TELEPHONE AND DATA NETWORKS

(71) Applicant: Sabse Technologies, Inc., Mountain View, CA (US)

(72) Inventors: Farzad Mobin, Palo Alto, CA (US); Touraj Parang, Los Altos, CA (US)

(73) Assignee: Sabse Technologies, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,472

(22) Filed: Oct. 14, 2013

(65) Prior Publication Data

US 2014/0036907 A1 Feb. 6, 2014

Related U.S. Application Data

(63) Continuation of application No. 13/149,699, filed on May 31, 2011, now Pat. No. 8,560,733, which is a continuation of application No. 11/838,119, filed on Aug. 13, 2007, now abandoned.

(60) Provisional application No. 60/836,751, filed on Aug. 11, 2006.

(51) Int. Cl.
*H04L 29/06* (2006.01)

(52) U.S. Cl.
USPC ............................................... 709/249

(58) Field of Classification Search
USPC .......... 709/249, 228, 229, 205, 206; 455/401, 455/402, 414.1, 415; 370/254, 352
See application file for complete search history.

(56) References Cited

U.S. PATENT DOCUMENTS

| | | | |
|---|---|---|---|
| 6,430,289 B1 | 8/2002 | Liffick | |
| 6,650,901 B1 | 11/2003 | Schuster et al. | |
| 6,804,333 B1 | 10/2004 | Liu et al. | |
| 7,310,772 B2 | 12/2007 | Whitfield | |
| 7,346,156 B1 | 3/2008 | Choupak et al. | |
| 7,680,259 B2 | 3/2010 | Kent, Jr. et al. | |
| 2001/0005415 A1 | 6/2001 | Grunsted et al. | |
| 2001/0039561 A1 | 11/2001 | Cho | |
| 2005/0074102 A1* | 4/2005 | Altberg et al. | 379/114.1 |
| 2005/0175165 A1* | 8/2005 | Holder | 379/221.15 |
| 2007/0115928 A1 | 5/2007 | Benco et al. | |
| 2010/0290365 A1* | 11/2010 | Kwong et al. | 370/254 |

OTHER PUBLICATIONS

Select file history of related U.S. Appl. No. 13/149,699, from Feb. 28, 2013 to Sep. 13, 2013, 37 pages.

* cited by examiner

*Primary Examiner* — Thai Nguyen
(74) *Attorney, Agent, or Firm* — Lathrop & Gage LLP

(57) ABSTRACT

A method and system for communicating across telephone and data networks are disclosed. According to one embodiment, a computer-implemented method, comprises receiving a first call from a first user phone that converts the first call from a format of a first local phone network to a first digital call. The first digital call is transmitted over a large area data network. The first digital call is converted to a format of a second local phone network to generate a second call. The second call is transmitted to a second user phone over the second local phone network. A real-time bi-directional voice communication session is established between the first user phone and the second user phone.

20 Claims, 4 Drawing Sheets

METHOD AND SYSTEM FOR COMMUNICATING ACROSS TELEPHONE AND DATA NETWORKS

RELATED APPLICATION

This application is a continuation of U.S. patent application Ser. No. 13/149,699, filed May 31, 2011, which is a continuation of U.S. patent application Ser. No. 11/838,119, filed Aug. 13, 2007, which claims priority to U.S. Provisional Patent Application No. 60/836,751 filed on Aug. 11, 2006. Each of the aforementioned applications is hereby incorporated by reference.

FIELD

The field of the invention relates generally to computer and phone switch systems and more particularly relates to a method and system for communicating across telephone and data networks.

BACKGROUND

The telecommunications industry keeps witnessing rapid changes in the way people and organizations communicate. Many of these changes spring from the explosive growth of the Internet and from applications based on the Internet Protocol (IP). The Internet has become an omnipresent means of communication, and the total amount of packet-based network traffic has quickly surpassed traditional voice (circuit-switched) network traffic, such as PSTN's (Public Switched Telephony Networks) and the like.

Technological advancements have helped telecommunication service providers, users, and suppliers realize that voice traffic and services may be one of the next major inroads to take full advantage of IP. This expectation is based on the impact of a new set of technologies generally referred to as Voice over IP (VoIP) or IP telephony.

VoIP supplies many unique capabilities to service providers and users who depend on IP or other packet-based networks. The most important benefits include the following: cost savings, open standards and multi-vendor interoperability, and integrated voice and data networks.

In the case of cost savings, users can reduce or eliminate toll charges associated with transporting calls over the PSTN by moving voice traffic to IP networks. In the case for open standards and multi-supplier interoperability, both service providers and/or users can purchase equipment from multiple suppliers and eliminate their dependency on proprietary solutions. Finally, in the case for integrated voice and data networks, service providers and/or users can build truly integrated networks for voice and data by making voice "just another IP application". These integrated networks not only provide the quality and reliability of today's PSTN, but they also enable users to quickly and flexibly take advantage of new opportunities within the changing world of communications.

The first VoIP products were targeted at users looking to reduce telecommunication expenses by moving voice traffic to packet networks. To take advantage of favorable regulatory treatment of IP traffic and without any established standards, most early implementations were based on proprietary technology.

Session Initiation Protocol (SIP) was designed as a multimedia protocol that could take advantage of the architecture and messages found in popular Internet applications. By using a distributed architecture—with universal resource locators (URLs) for naming and text-based messaging—SIP attempts to take advantage of the Internet model for building VoIP networks and applications. In addition to VoIP, SIP may be used for video-conferencing and instant messaging. As a protocol, SIP defines how sessions are to be set up and torn down. SIP may be used to invite a user to take part in a point-to-point or a uni-cast session. It utilizes other IETF protocols to define other aspects of VoIP and multimedia sessions, such as Session Description Protocol (SDP) for capabilities exchange, URLs for addressing, Domain Name Systems (DNS's) for service location, and Telephony Routing Over IP (TRIP) for call routing.

SUMMARY

A method and system for communicating across telephone and data networks are disclosed. According to one embodiment, a computer-implemented method, comprises receiving a first call from a first user phone that converts the first call from a format of a first local phone network to a first digital call. The first digital call is transmitted over a large area data network. The first digital call is converted to a format of a second local phone network to generate a second call. The second call is transmitted to a second user phone over the second local phone network. A real-time bi-directional voice communication session is established between the first user phone and the second user phone.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
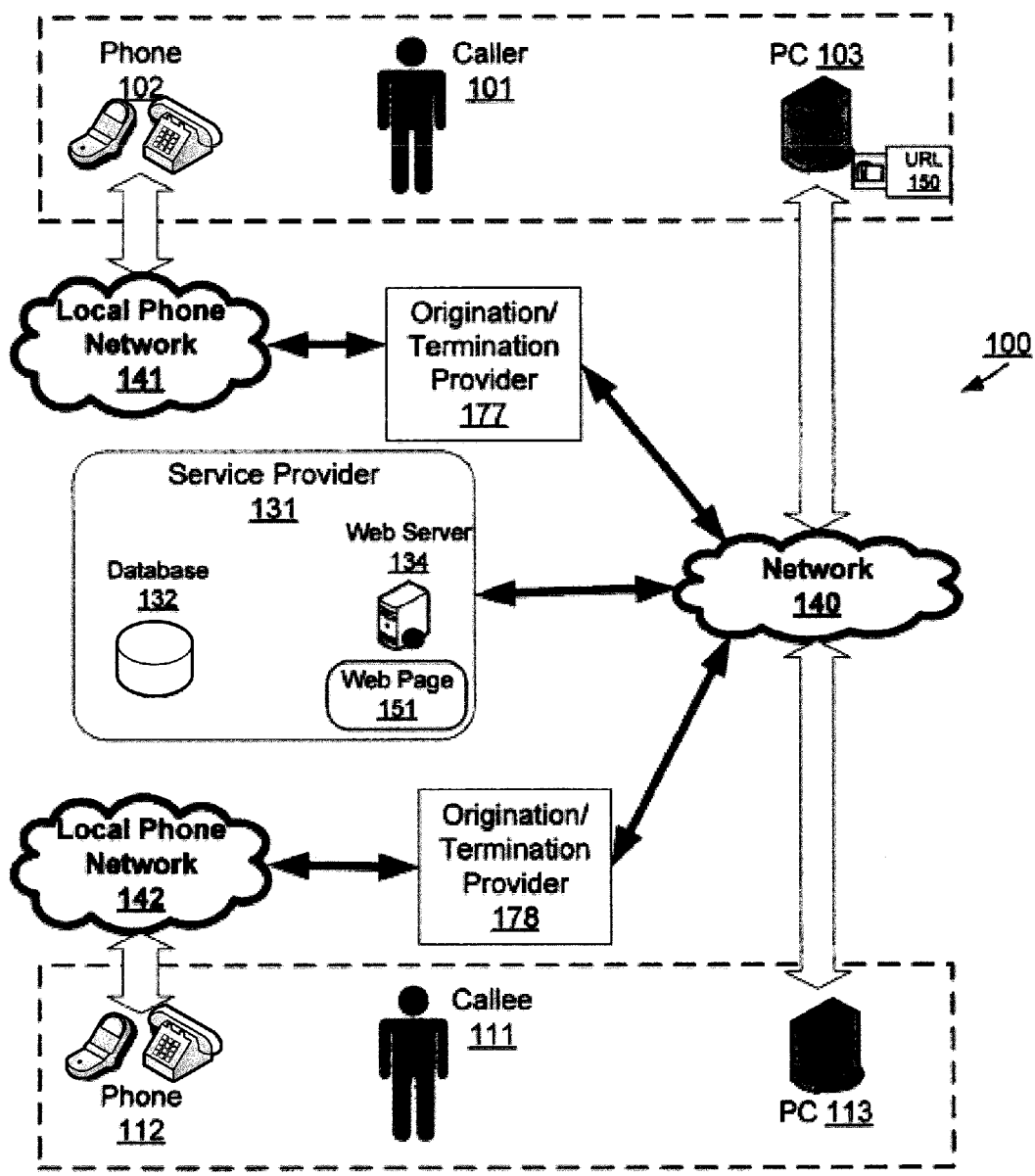
FIG. 1 illustrates a block diagram of an exemplary communications system, according to one embodiment.

A method and system for communicating across telephone and IP networks are disclosed. According to one embodiment, a computer-implemented method, comprises receiving a first call from a first user phone that converts the first call from a format of a first local phone network to a first digital call. The first digital call is transmitted over a large area data network. The first digital call is converted to a format of a second local phone network to generate a second call. The second call is transmitted to a second user phone over the second local phone network. A real-time bi-directional voice communication session is established between the first user phone and the second user phone.

According to another embodiment, the callee creates a URL by registering for a telephony service from a telephony service provider. The callee sends an email including the URL to the caller. After receiving the email, the caller clicks on the URL to establish a phone connection to the callee. The service provider receives the request by the URL click from the caller and makes two outbound phone calls to both the caller and the callee, and subsequently bridges them together. Both parties talk to each other on the phone and hang up to end the connection.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to systems for performing the operations herein. This system may be specially constructed for the required purposes, or it may comprise a general-purpose computer and switch devices selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, flash memories, random access memories, EPROMs, EEPROMs, magnetic or optical cards, or any type of media suitable for storing electronic instructions, and each coupled to a computer system bus.

The methods presented herein are not inherently related to any particular communication devices or systems. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, two individuals may communicate over the telephone when they are located in distant geographic locations. For example, the caller may be in the United States and the callee in Korea. Normally, the caller's phone has a local US phone number and the callee's phone has a local Korean phone number, such that calling one another would involve international dialing. According to one embodiment, the present method and system allows the caller and callee to communicate with each other without international dialing, by assigning local telephone numbers to the caller and callee. For example, the callee's phone in Korea is accessible by the caller through a US phone number, and the caller's phone in the US is accessible by the callee via a Korean phone number.

FIG. 1 illustrates a block diagram of an exemplary communications system 100, according to one embodiment. Communications system 100 includes a service provider 131 that connects a caller 101 and a callee 111 via network 140 and/or local phone networks 141 and 142. Caller 101 has access to PC 103 and/or phone 102 that can connect to network 140 and/or local phone network 141. Callee 111 has access to PC 113 and/or phone 112 that can connect to network 140 and/or local phone network 142.

Local phone networks 141 and 142 may be public switched telephone networks and are referred to herein as PSTN. Further, local phone networks 141 and 142 may be in whole or in part, wireless networks, such that caller's phone 102 and callee's phone 112 may be mobile devices. Continuing the example from above, local phone network 141 may service a local area in Korea and local phone network 142 may service a local area in the US.

Network 140 may be the Internet, a Wide Area Network (WAN), a Local Area Network (LAN), or any other type of network that enables two or more devices to exchange information. Further, network 140 may be in whole or in part a wireless network, such that caller's PC 103 and callee's PC 113 may be wireless devices.

Service provider 131 allows callers and callees to communicate via their respective telephones without international dialing, by assigning local telephone numbers to the caller and callee. Service provider 131 includes server 134 that executes software that allows callers and callees to communicate. The software executed on server 134 includes instructions to send and receive data from database 132, origination provider 177 (that may also be a termination provider based on whether a call is being placed or received), termination provider 178 (that may also be an origination provider based on whether a call is being placed or received), and network 140. Server 134 assigns a local phone number to a remote phone. For example, phone 112 in the US and phone 102 in Korea have unique phone numbers that are recognized by server 134 using caller identification (CID) technology. Server 134 associates the two phone numbers to generate a unique connection identifier, specific to phone 102 and phone 112. Server 134 associates a local US phone number to the unique connection identifier that phone 112 may use to call phone 102 in Korea. Server 134 can also associate a local Korean phone number to the unique connection identifier that phone 102 may use to call phone 112 in the US. In other words, phone 112 dials the US phone number assigned by server 134 to reach phone 102 in Korea. Server 134, using caller ID, recognizes the phone number of US phone 112 and that the number dialed by phone 112 is the US phone number assigned by server 134 to reach phone 102 in Korea. Server 134 routes the call to phone 102 in Korea. This method allows local phone numbers to be reused. For example, the same US phone number assigned by server 134, when associated with another phone in the US (other than phone 112), could reach a phone located in India.

Server 134 may also include a web server to provide HTML web pages to PC 103 and PC 113. The web pages may be used to register new subscribers to service provider 131. Web pages may also be provided using a HyperText Transfer Protocol (HTTP) server, a File Transfer Protocol (FTP) server, an Internet Relay Chat (IRC) server, etc., via a TCP/IP connection or other similar connection protocol. The operating system of web server 134 may be Windows®, LINUX, SUN Solaris®, Mac OS, Tiger, or other similar operating system. In one embodiment, web server 134 comprises multiple dedicated servers. It uses processing logic, tools and databases and is built using a combination of technologies such as those from Apache Software (www.apache.org) such as Tomcat servers; Java based technologies such as J2EE, EJB, JBOSS, JDBC; and/or databases such as MySQL.

In one embodiment, service provider 131 receives IP traffic from origination provider 177 that interconnect local phone network 141 and/or network 140. For example, service provider 131 may receive a call that has originated on local phone network 141 and relay the call from local phone network 141 to another local phone network 142 using origination provider 177, termination provider 178, network 140 (e.g., the Internet). Origination provider 177 converts calls from the protocol of the originating local network 141 to a protocol supported by network 140 and, finally, termination provider 178 converts the call to the protocol of the destination local network 142. For example, local network 141 may be a CDMA wireless network, network 140 may be the Internet supporting HTTP over TCP/IP and local network 142 is a GSM network. Origination provider 177 converts the call from CDMA to HTTP. Termination provider 178 converts the call to GSM. In one embodiment, origination provider 177 and termination provider 178 are the same provider, and in another embodiment, origination provider 177 and termination provider 178 are independent entities.

Service provider 131 includes database 132 that is used to store information pertaining to the devices and entities of system 100. Information stored in database 132 may include the phone number of phone 102 and the phone number of phone 112, and a direct inward dial (DID) number that a caller 101 can call to reach callee 111. Although not required, database 132 may also store the user name and password for caller 101 and callee 111, calling preferences for caller 101 and callee 111 (e.g., call forwarding numbers, number of rings, voicemail settings, etc.), personal registration information (e.g., name, postal address, e-mail addresses, billing information), stored voicemail messages, stored digital content (e.g., music, videos, computer data files, etc.), voicemail greetings, transaction logs, accounting data, information relating to local networks 141 and 142 (e.g., password to voice mail boxes, speed dialing, etc.), rules and settings associated with the service administered by service provider 131. In one embodiment, database 132 may include tables that map URLs, IP address, local network access numbers, and user phone numbers.

Service provider 131 also is compatible with voice over Internet services, such as SKYPE, offered by eBay, Inc. of California. Accordingly, database 132 may store information relating to a user's SKYPE, or similar VoIP information.

According to one embodiment, service provider 131 may allow caller 101 and callee 111 to communicate on their respective phones 102, 112, without revealing the phone numbers of phones 102, 112 with each other. Instead the caller ID information exchanged between caller 101 and callee 111 may be local phone numbers assigned by service provider 131. The local phone numbers assigned by service provider 131 are DID numbers that the caller 101 and callee 111 use to reach each other. According to one embodiment, service provider 131 allows the caller ID information to be anonymous in one direction. For example, callee 111 receives caller ID information of the local phone number assigned by service provider 131, and caller 101 receives the caller ID information of the phone number of callee's phone 112. Having received a phone number for caller 101 in its caller ID, callee 111 may store the phone number in its phone book, and use that number to reach caller 101 in subsequent calls.

System 100 may include PC 103 and PC 113. PC 103 and PC 113 may be any standard personal computer that may be connected to network 140 (e.g., the Internet) using a browser. Web browsers such as MICROSOFT'S INTERNET EXPLORER, NETSCAPE BROWSER, MOZILLA, FIRE-FOX, or the SAFARI browsers support HTML and JavaScript. Additionally, PC 103 and PC 113 may be mobile devices, such as IP phones, videophones with web browsers, laptops, smart phones with web browsers, mobile phones with web or WAP browsers, PDAs, game devices such as the PSP manufactured by Sony Electronics, multimedia devices such as iPods and iPhones manufactured by Apple Computers of Cupertino, Calif., or similar devices.

System 100 includes phone 102 and phone 112. Phone 102 and phone 112 may be any standard telephone that may be connected to network 141, 142 (e.g., PSTN). Additionally, phone 102 and phone 112 may be mobile devices, IP phones, videophones, smart phones, iPhones manufactured by Apple Computers of Cupertino, Calif., or similar devices.

Although described so far as phone to phone connections, system 100 supports many additional connection types, including:
Phone to PC;
PC to PC; and
PC to phone.

According to one embodiment, caller 101, using PC 102 visits a website on network 140 (e.g., the Internet), for example a web page with a listing of a home for sale in San Francisco. From the web page, caller 101 may click on a link that is labeled "talk to the agent now." The link has a unique URL 150 associated with it that is provided by service provider 131. Once caller 101 clicks on the unique URL 150, service provider 131 automatically connects caller 101 to callee 111 by initiating phone calls to both parties. In this embodiment, caller 101 is prompted to provide a phone number at which the agent (callee 111) can contact caller 101. Service provider 131 analyzes the phone number provided by caller 101 and assigns a DID number that may be used by the agent to reach the caller 101, where the DID number is a local phone number on network 142. The DID number may be communicated to the agent via an SMS text message to the agent's wireless phone 112, via an e-mail to the agent's PC 113, via a call made by service provider 131 with a voice message to call caller 101 at the assigned DID number, or a similar process.

According to one embodiment, caller 101 has a preferred phone number (for callees to reach the caller) stored in database 132. The preferred phone number may be the phone number of phone 102 or a VoIP phone number associated with PC 102. Service provider 131 may allow the agent's phone number to remain anonymous, where caller 101 only receives the caller ID information of the assigned DID from service provider 131.

According to another embodiment, when the caller 101 clicks the URL, service provider 131 provides caller 101 with a phone number (DID number) to reach the agent. Service provider 131 analyzes the phone number provided by caller 101 to determine and assign the DID number that is a local call for caller 101. Service provider 131 associates the phone number of caller 101 to the assigned DID, such that when caller 101 calls the assigned DID number, service provider 131 automatically routes the call to the agent. By associating the phone number of a caller to an assigned DID number, it is possible for service provider 131 to reuse DID numbers. For example, a second caller may be provided the same DID number provided to caller 101, however, when the DID number is used by the second caller, someone other than the agent is reached.

According to another embodiment, upon clicking the link, a call is initiated to callee 111 at PC 113, rather than phone 112. Service provider 131 allows any number of unique URLs to be created that initiates a specific connection to a particular callee at a particular callee device. According to one embodiment, service provider 131 serves the web page 151 (or a third party web server serves a web page) with an embedded link to URL 150.

System 100 also allows two people to communicate over the telephone without exchanging phone numbers. In other words, one user may find another user via web server 134, perhaps by name or e-mail address. A phone call may be initiated by clicking on a link associated with the user. Service provider 134 may then initiate calls to both parties. Additionally, calls may be initiated by the phone 102, 112, or by PC 103, 113. Calls may also be initiated on one device and then connected on another device. For example, a call may be initiated by caller 101 on PC 103, and service provider 143 connects caller 101 to callee 111 on phone 102.

A local number assigned to either caller 101's devices or callee 111's devices may be a DID number provided by service provider 131. An additional identifier such as a mail box ID, or an extension number may be used to share a single DID number amongst multiple users. By using caller ID assigned by service provider 131 instead of the "real" caller ID, a calling party may conceal its identity to the opposite party. Additionally, a specific mail box can be assigned to a phone number as identified by a caller ID system. The mail box saves voice messages, or plays a pre-recorded message, music, or any other similar audio.

Besides real-time phone communications, service provider 143 also supports communication of e-mails, voice mails, instant messages, video conferencing, video mail, and data transfer (e.g., MP3, MPEG-4, .PDF, DOC, etc.)

In another embodiment, system 100 permits all caller-ID information (e.g., phone number of caller 101, name, etc.) to be passed through to callee 111. A subset of caller-ID information may also be passed on, for example simply a name, without the phone number of caller 101. In another embodiment, caller 101's name is passed on with the local phone number assigned by service provider 143.

The request for a service provided by service provider 131 may be made in many ways. A user may use a direct internet connection to web server 134, send an email, a text message, an SMS message or any similar form of data message.

Callee 111 may provide his/her telephone number(s) 112 and other information such as preferences, personal information, rules or settings. For example, when multiple telephone numbers are registered, callee 111 could specify a priority order for service provider 131 to call the telephone numbers. Callee 111 can assign a priority to various connection types, such as phone, instant messaging or text messaging. When callee 111 is unavailable, incoming calls may be sent to a voice mail box. Callee 111 may configure calls to be routed to a voice mail box during a certain period of time. Callee 111 can also configure custom rules and connectivity settings and have them stored on database 132 of service provider 131. Access to web page 151 may be regulated by callee 111 as well. For example, callee 111 may configure his/her account with service provider 131 to allow a group of callers to reach him/her by phone, or to block another group of callers from calling his/her phone.

Once the registration process is complete, callee 111 can send an email including URL 150 to caller 101. URL 150 can be sent to caller 101 in many ways. URL 150 may be extracted from callee 111's blog, an electronic business card, emails, text messages, SMS messages, web pages, phone book or directory service or any other form of data communication.

Caller 101 receives an email including URL 150 from callee 111 or locates URL 150 created by callee on the Internet. URL 150 might have been stored on caller 101's local repository such as Microsoft Outlook, favorites of Microsoft Internet Explorer or shortcut of such kind on his/her PC 102.

Figure 2:
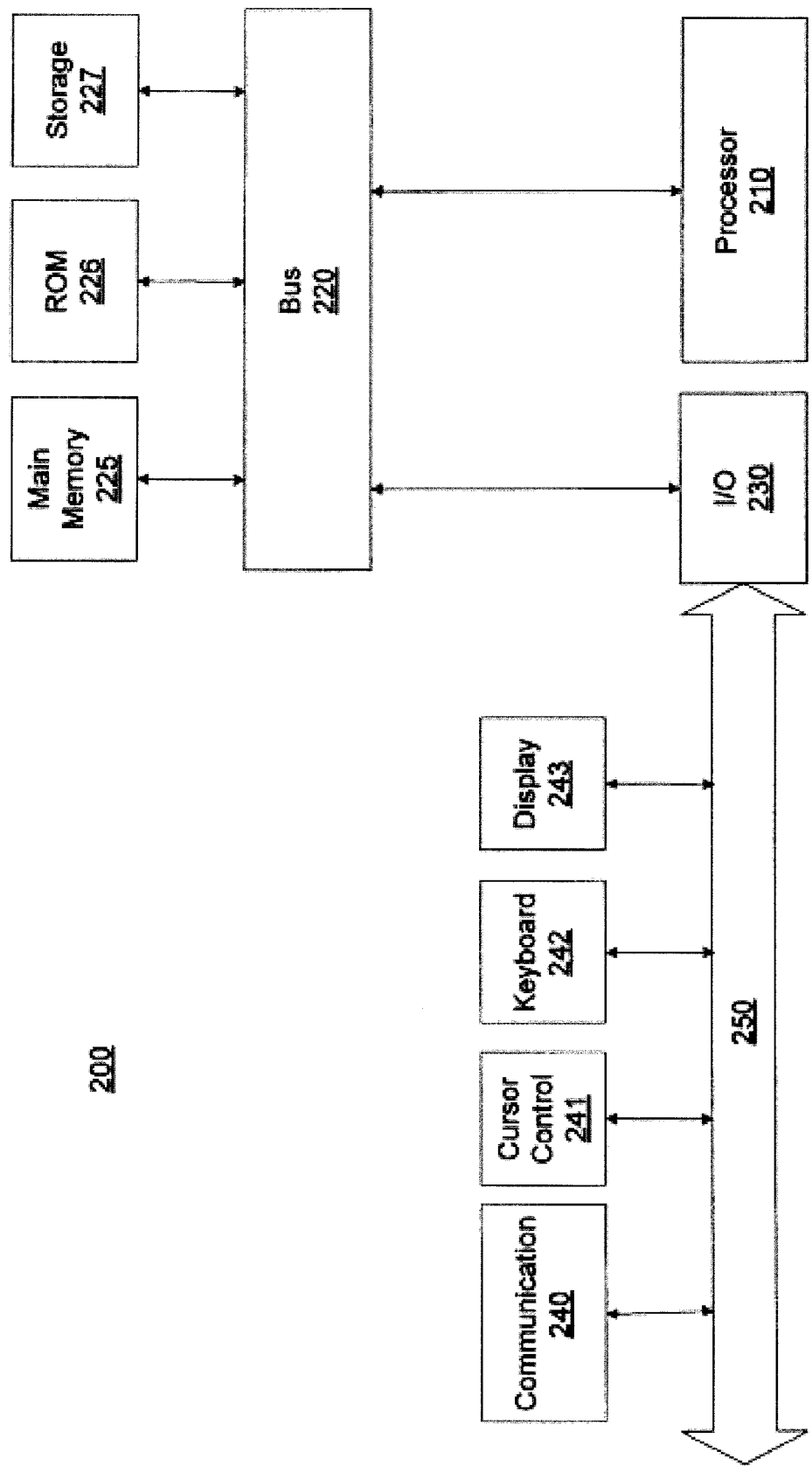
FIG. 2 illustrates an exemplary computer architecture for use with the present system, according to one embodiment.

FIG. 2 illustrates an exemplary computer architecture 200 for use with the present system, according to one embodiment. Computer architecture 200 can be used to implement a server 134, PC 103, PC 113, phone 102, phone 113 of FIG. 1.

One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241).

The communication device 240 allows for access to other computers (servers or clients) via a network. The communication device 240 may comprise a modem, a network interface card, a wireless network interface or other well known interface device, such as those used for coupling to Ethernet, token ring, or other types of networks.

Figure 3:
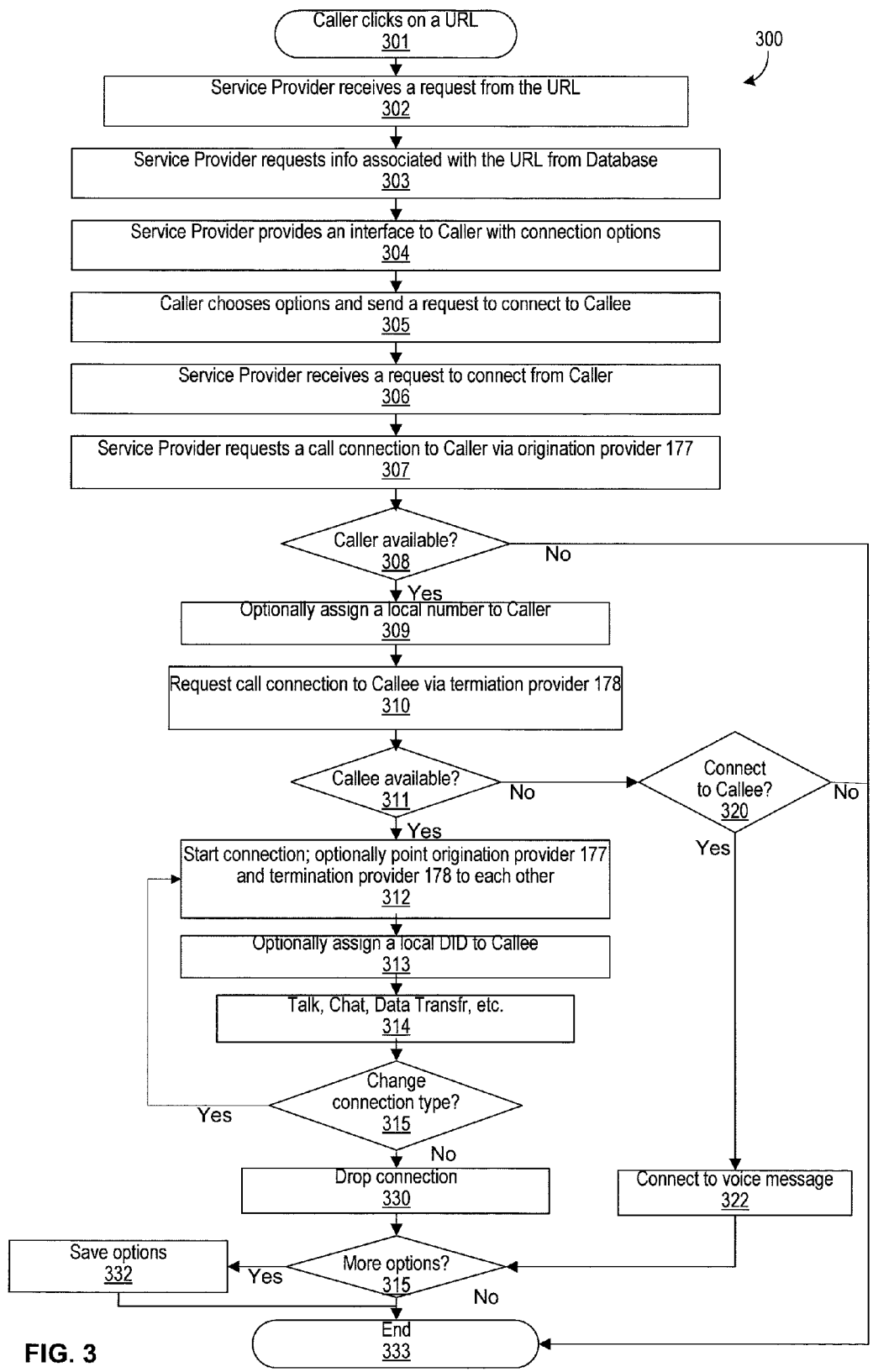
FIG. 3 illustrates a diagram of an exemplary process for connecting a caller and a callee, according to one embodiment.

FIG. 3 illustrates a diagram of an exemplary process 300 for connecting a caller 101 and a callee 111, according to one embodiment. Caller 101 clicks on URL 150 (301) that allows PC 103 to connect to the web server 134 of service provider 131. The connection of PC 103 to web server 134 acts as a request for web server 134 to provide a service, for example, to connect caller 101 to callee 111. In another embodiment, caller 101 may click on URL 150 from his/her mobile 102 or Blackberry® with wireless network connectivity.

When URL 150 is selected, caller 101's phone number may be sent to service provider 131. Caller 101 may be prompted on PC 103 to provide the phone number, or the phone number may have already been stored in a cookie on PC 103. Service provider 131 receives the request (including the caller's phone number) (302) and queries database 132 for any information that associated with the caller's phone number that may be needed to process the request (303). The information is transferred to the web server 134 and repackaged to be presented to caller 101 in a user interface (304). The UI may be a web page on a web browser, a client program preinstalled on caller's PC 103, or any other type of information delivery interface. In the case of a direct telephone connection between caller 101 and callee 111, the UI may be a caller ID display. In the UI, caller 101 may be presented with options for connecting to callee 111. Caller 101 selects an option and by doing so requests that service provider 131 connect caller 101 with callee 111 (305). In one embodiment, callee 111 may want to transfer an electronic document without speaking to caller 101. Service provider 131 may disable the "talk" and "chat" option and enable a "data transfer" option instead. In another embodiment, callee 111 may set a time and date that he/she is available and enable a voice messaging option otherwise.

Upon caller 101's selection of a connection option (for example, "talk"), service provider 131 identifies the preferred connectivity type and initiates a call connection to caller 101 via origination provider 177 (307). If caller 101 is available (308), service provider 131 may assign a local phone number to caller 101 (309). If caller 101 is not available (308), the call connection to caller 101 ends. Service provider 131 initiates another call connection to callee 111 depending on the connectivity option chosen by caller 101 (310). In another embodiment, calls to caller 101 and callee 111 are simultaneously initiated by service provider 131. In one embodiment, a sequence of special key strokes, such as "*4" from caller 101's mobile phone may drop the phone connection and establish a network connection for "data transfer" through network 140.

Service provider 131 checks the availability of callee 111 (311). If the callee 111 is available, the connection between callee 111 and caller 101 begins. If the callee 111 is not available a connection to the call may still be connected (320) to leave a voice message (322). If caller 101 wishes, a voice message can be stored in callee 111's voice mail box located on either service provider 131 or network 142 (322). If caller 101 does not want to leave a voice message for an unavailable callee, the call is terminated (333).

According to one embodiment, when those two calls are established, the service provider 131 bridges the two parties. Optionally, service provider 131 points origination provider 177 and termination provider 178 to each other directly so that service provider 131 is off the voice traffic path (312). Service provider 131 optionally assigns a local DID number to Callee 111 (313). The local DID number is chosen by using a closest distance process. In one embodiment, a table of city names and their city codes is merged with a table of city names and their longitudinal and latitudinal coordinates. In a country where service provider 131 has a certain quantity of DID numbers scattered between different cities, caller 101's or callee 111's numbers are checked against their city codes as well as the longitudinal and the latitudinal coordinates. The longitudinal and the latitudinal coordinates are then compared to the DIDs available in the country and the closest distance available DID is chosen as the best matching local DID.

Depending on the connectivity type negotiated between caller 101 and callee 111, caller 101 and callee 111 may speak, IM chat or data transfer (314). In another embodiment, if caller 101 chose internet chat as a connectivity option, both caller 101 and callee 111 are provided chat windows (314). The chat window may be of a chat client such as Google talk or MSN IM that is already installed on their PCs 103 and 113, or a web-based chat client.

In another embodiment, if caller 101 and callee 111 wish to transfer data, such as electronic fax, audio and video clips, digital pictures, electronic documents, etc., a data transfer protocol (e.g., FTP, SFTP, SMTP) may be established between the two parties devices and the data transfer starts (314).

The connectivity type may be changed or an additional connectivity type is added during an ongoing connection (315). For example, callee 111 may want to send a digital picture to caller 101 while on a phone conversation. Service provider 131 may offer a temporary pause of the phone conversation to allow the transfer of the picture and resume the phone conversation thereafter. Service provider 131 may establish another connection through other available channels to allow uninterrupted phone conversation.

Upon terminating the connection (330), both parties may be offered further options (331) prior to the completion of the connection. One option may be to save the conversation or IM chat. Caller 101's personal information and phone number might be, in this process, saved to database 132 (332). After saving these options, the two parties are disconnected to complete the connection (333).

A callee's 111 availability may be affected by various configuration parameters. For example, database 132 may include information about callee 11's availability based on the time and date of the call, or service provider 131 may send a text message to callee 101's phone 112 requesting his/her availability. Once callee 111's availability is confirmed, service provider 131 connects to a device of callee 111 while caller 101 is still waiting on another line.

However, callee 111 may not be available or may not want to answer the request from service provider 131. Callee 111 may be prompted to select another connectivity option such as text messaging or voice messaging.

In one embodiment, both caller 101 and callee 111 agree to communicate via a phone. Both parties receive a phone call from service provider 131 and service provider bridges the calls. In making these phone calls, server side code 135 embedded in web page 151 triggers the connection to the parties.

The UI may be customized by callee 111 to resemble a particular shape or picture such as a telephone, or an audio visual capable graphic or skin. The UI may also display pertinent information, such as the phone number of callee 111 that is stored in database 132. The UI may also display the status of callee 111 such as "available" or "busy" by querying the status of callee 111.

Caller 101 may want to change the connection type used during the call. In one embodiment, caller 101 clicks on URL 150 from his/her PC 103 to talk to callee 111 instead of maintaining a data connection. Caller 101 may be prompted to provide his/her phone number 102 and service provider 131 makes a call to the provided phone number.

In one embodiment, UI may contain a Microsoft Instant Messenger chat window, that is loaded using caller 101's login credentials. The process of launching, logging in, and selecting the destination IM buddy may be automatically done by code contained in web page 151 and presented to caller 101 in a UI that enables immediate online conversation. In another embodiment, the UI of caller 101 may have multimedia capabilities and present caller 101 with a custom audio ring tone or a picture specified by callee 111. Caller 101 may use the UI to instruct PC 103 to execute a routine such as turning on a web camera, automatically printing a document, transferring a file or burning a CD. In another embodiment, an audio stream may be inserted into the telephone conversation before, after or during the telephone conversation.

The present method and system limits the sharing of personal information. As an example, information identifying either caller 101 or callee 111 such as phone number, name, IP address etc, may be displayed to the other party or blocked from being displayed according to pre-selected settings or prompts for selecting preferences during a call.

Figure 4:
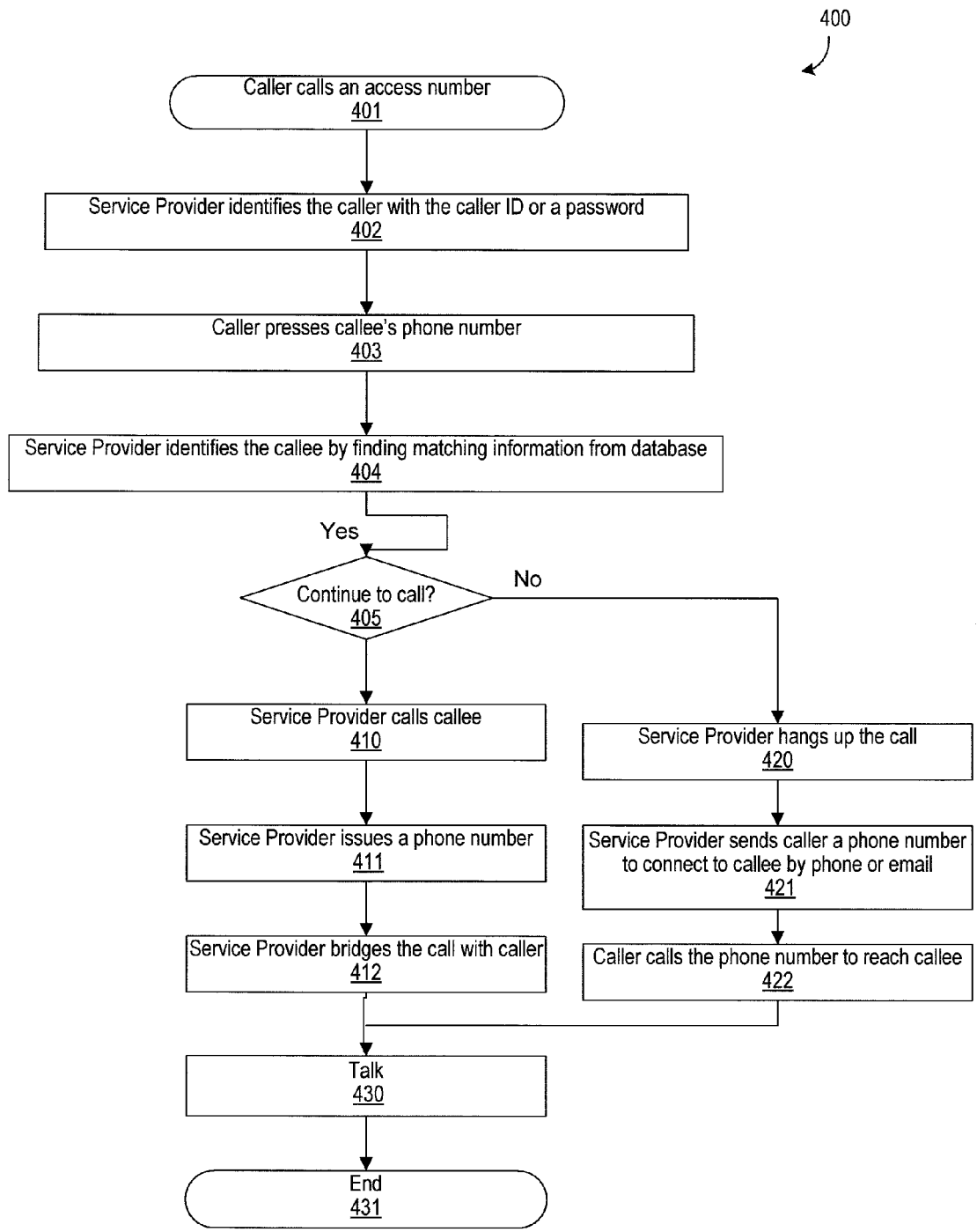
FIG. 4 illustrates a diagram of another exemplary process for connecting a caller and a callee, according to one embodiment.

FIG. 4 illustrates a diagram of another exemplary process 400 for connecting a caller 101 and a callee 111, according to one embodiment. Caller 101 dials an access number provided by service provider 131 (401). This access number may be a local, an intra national, an international or a toll free number. Service provider 131 recognizes the incoming caller 101 by the caller ID or through a verification process using a password or a personal identification number (PIN) (402). Once the identity of caller 101 is successfully recognized by provider 131, caller 101 continues to dial the callee 111's number (403). Callee 111's number is then looked-up to find matching information related to callee 111 on database 132 (404). After both caller 101 and callee 111 are identified, service provider 131 either disconnects caller 101 or calls callee 111 (405). If disconnected (420), service provider 131 sends caller 101 by a SMS message, an email a local phone number to reach callee 111 (421). Using this local phone number, caller 101 makes another call to reach callee 111 (422). Alternatively, service provider 131 continues to call callee 111 (410) while caller 101 is waiting to be bridged to callee 111 (412). A phone number is delivered to caller 101 (411). Whether service provider 131 disconnects on caller 101 or continues to connect callee 111, caller 101 is given a phone number which identifies callee 111 to make subsequent calls to callee 111 without calling into the access number of service provider 131. In this manner, PC 103 is not needed to initiate a service request.

The optional local DID numbers provided to caller 101 and callee 111 provide a mechanism for either party to call at local calling rates and dialing a phone number without PCs 103 and 113. The local DID may be stored in caller 101 or callee 111's phonebook as any other phone number.

Voice traffic may be routed through service provider 131 or exchanged directly between origination provider 177 and termination provider 178 without intervention by service provider 131. In addition, a signaling mechanism may be instituted to reroute the voice traffic to service provider 131 at any point in time between the beginning and the end of a call. While a call is in progress, caller 101, callee 111 or a computer program through a UI, can cause the voice traffic to be redirected to service provider 131 and the voice traffic is proxied through and optionally recorded to service provider 131.

The utility of URL 150 can be extended in a variety of ways and may be simulated by email messages, text messages or SMS messages or the like sent to a particular destination. For example, caller 101 may send an email to service provider 131 at an address associated with callee 111's URL in database 132. In one embodiment, caller 101 receives an electronic business card from callee 111, the electronic business card including an email address, callee111@xxx.com. By sending an email to that email address, service provider 131 makes two outbound calls to both caller 101 and callee 111 and connects the two parties by process 300. According to this embodiment, caller 101 does not need to have callee 111's phone number to reach callee 111. Service provider 131 also allows both callee 111 and caller 101 to block their identification by substituting it with a specific email address, phone number, chat ID or IP address.

URLs may be offered free of charge, or the service offering URLs may require either the caller 101 or the callee 111 to pay per minute, per call and/or per period of time before connecting the caller with the callee. In addition, the service may charge for personalization features, such as custom ring tones or voicemail boxes. The service may also charge a callee for the ability to call back a caller from an automatically populated web-based phonebook. The service may charge a transaction fee for allowing a caller and a callee to engage in commercial transactions during the communication, such as in the case of a consultant charging callers on a per minute basis.

System 100 also provides a SIP-re-invite process. The system 100 connects two legs of a call, such that all information is not relayed back-and-forth, hence reducing bandwidth needs as well as decreasing latency (which would appear as echo).

A method and system for communicating across telephone and data networks have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:

1. A system for providing communication between a caller and a callee over a telephone and data network, the system comprising:
 a service provider including
  a web server, accessible by a caller and a callee, and
  a database including non-transitory computer readable medium for storing a callee contact identifier distinct from a callee phone number;
 an origination provider for receiving a call, to a caller local direct-inward-dial (DID) number, from the caller, the origination provider configured to transmit notification of a first communication from the caller to the caller local DID number; and,
 a termination provider for establishing a connection to the callee;
 wherein the service provider is configured to:
  receive an indication to establish a connection to the callee based upon a callee contact identifier distinct from a real identity of the callee,
  allocate the caller local direct-inward-dial (DID) number based upon a geographic location of the caller at the time the indication is received,
  send a communication request to the termination provider to configure a second communication to the callee using a callee local DID at the time the notification of the first communication is received, and
  establish a connection between the caller and the callee, via the origination provider and the termination provider, upon notification from the origination service provider that the caller has dialed the caller local DID.

2. The system of claim 1, wherein the service provider also including an interface for interacting with the caller to define at least one option for the connection.

3. The system of claim 2, wherein the at least one option includes one or more of
 establish a voice communication session between the caller and the callee,
 establish a textual data transfer between the caller and the callee, and/or
 establish a data transfer session between the caller and the callee.

4. The system of claim 1, wherein the indication includes one or more of:
 an indication of the caller clicking on the URL at a caller personal computer,
 an indication of the caller clicking on the URL at a caller phone,
 an e-mail received from the caller at an address associated with the URL,
 a phone number received from the caller associated with the URL,
 a name received from the caller associated with the URL, and/or
 an IP address received from the caller associated with the URL.

5. The system of claim 1, wherein the caller local DID number is based upon the geographic location of the caller at the time the indication is received.

6. The system of claim 1, wherein the connection is established such that the only the callee contact identifier is displayed to the caller and/or only the caller contact identifier is displayed to the callee, the caller contact identifier being distinct from the caller phone number.

7. The system of claim 1, wherein the caller contact identifier is selected from a group of identifiers consisting of:
 the caller local DID, a caller name defined within the web server by the caller,
a caller e-mail address, and
other caller information unique from a real caller identity of the caller.

8. The system of claim 7, wherein the connection is established such that the only the caller contact identifier is displayed to the callee such that the real caller identity is concealed from the callee.

9. The system of claim 1, wherein the callee contact identifier is selected from a group of identifiers consisting of:
a callee local DID based upon a geographic location of the callee at the time the indication is received,
a callee name defined within the database by the callee,
a callee e-mail address, and
other callee information unique from a real callee identity of the callee defined within the database by the callee.

10. The system of claim 9, wherein the connection is established such that the only the callee contact identifier is displayed to the caller such that the real callee identity is concealed from the caller.

11. The system of claim 1, wherein the notification is automatic and based upon the caller calling the caller local DID.

12. The system of claim 1, wherein the notification is based upon the caller identification (CID) and the service provider is further configured to authenticate the CID prior to establishing the connection.

13. A method for providing communication between a caller and a callee over a telephone and data network, the method comprising:
receiving from the caller, at a web server of a service provider, an indication to establish a connection to the callee based on a callee contact identifier distinct from a real identity of the callee;
allocating, within the service provider, a caller local direct-inward-dial (DID) number based upon a geographic location of the caller at the time the indication is received;
receiving, from an origination provider, notification of a first communication from the caller to the caller local DID number;
sending a communiation request to a termination provider to configure a second communication to the callee using a callee local DID of the callee at the time the notification of the first communication is received; and,
joining the first and second communications to establish the connection between the caller and the callee.

14. The method of claim 13, further comprising, after the step of receiving, generating an interface, accessible by the caller, including at least one option to define the connection.

15. The method of claim 14, wherein the at least one option includes one or more of:
establish a voice communication session between the caller and the callee,
establish a textual data transfer between the caller and the callee, and
establish a data transfer session between the caller and the callee.

16. The method of claim 13, wherein the indication includes one or more of:
an indication the caller clicks on the URL at a caller personal computer,
an indication the caller clicks on the URL at a caller phone,
an e-mail received from the caller at an address associated with the URL,
a phone number received from the caller associated with the URL,
a name received from the caller associated with the URL, and/or
an IP address received from the caller associated with the URL.

17. The method of claim 13, wherein the step of joining comprises displaying the callee contact identifier to the caller such that a real callee identity of the callee is concealed from the caller.

18. The method of claim 17, wherein the callee contact identifier is selected from a group of identifiers consisting of:
the callee local DID,
a callee name defined within the database by the callee,
a callee e-mail address, and
other callee information unique from the real callee identity of the callee defined within the web server by the callee.

19. The method of claim 13, wherein the step of joining comprises displaying a caller contact identifier, unique from a real identity of the caller, to the callee such that the real caller identity is concealed from the callee.

20. The method of claim 19, wherein the caller contact identifier is selected from a group of identifiers consisting of:
the caller local DID,
a caller name defined within the web server by the caller,
a caller e-mail address, and
other caller information unique from a real caller identity of the caller defined within the web server by the caller.

* * * * *